United States Patent [19]

Konrad et al.

[11] Patent Number: 6,073,064
[45] Date of Patent: Jun. 6, 2000

[54] DEVICE AND PROCESS FOR LIMITING ACCESS TO AUTHORIZED USERS

[75] Inventors: Reimund Konrad, Gummersbach; Wilfried Petsching, Wipperfürth; Bernd Weiss, Gummersbach, all of Germany

[73] Assignee: Delphi Automotive Systems Deutschland GmbH, Wuppertal, Germany

[21] Appl. No.: 08/869,060

[22] Filed: Jun. 4, 1997

[30] Foreign Application Priority Data

Jun. 6, 1996 [DE] Germany ............... 196 22 721

[51] Int. Cl.$^7$ .................. E05B 49/00; B60R 25/00
[52] U.S. Cl. .................. 701/36; 340/426; 307/10.5
[58] Field of Search .................. 701/1, 36; 340/426, 340/825.31; 307/10.2, 10.3, 10.4, 10.5

[56] References Cited

U.S. PATENT DOCUMENTS

| | | | |
|---|---|---|---|
| 4,492,959 | 1/1985 | Mochida et al. | 340/825.56 |
| 5,406,274 | 4/1995 | Lambropoulos et al. | 340/825.69 |
| 5,506,575 | 4/1996 | Ormos | 340/825.31 |
| 5,635,916 | 6/1997 | Bucholtz et al. | 340/825.31 |
| 5,864,297 | 1/1999 | Sollestre et al. | 340/825.31 |

FOREIGN PATENT DOCUMENTS

| | | |
|---|---|---|
| 268 902 | 2/1991 | European Pat. Off. . |
| 0503695 | 9/1992 | European Pat. Off. . |
| 535 555 A1 | 4/1993 | European Pat. Off. . |
| 0596343 | 5/1994 | European Pat. Off. . |
| 4435894 | 4/1993 | Germany . |
| 36 11 147 C2 | 2/1995 | Germany . |
| 4441001 | 5/1995 | Germany . |
| 4317119 | 4/1996 | Germany . |

OTHER PUBLICATIONS

Malmros, "Access Control System," IBM Technical Disclosure Bulletin, vol. 14, No. 22, p. 3860 (1972).

*Primary Examiner*—Michael J. Zanelli
*Attorney, Agent, or Firm*—Proskauer Rose LLP

[57] ABSTRACT

A device for limiting access to authorized users, for example, a vehicle access limiting device, includes a control device and a key device. The control device has memory wherein a preset user code and a preset secret code are stored. The key device has a transponder which includes a memory for storing the user code and the secret code transferred from the control device. The transponder emits the user code which has been encoded with the transferred secret code. The control device includes a comparison device which allows access only when the encoded user code emitted by the transponder agrees with preset information stored in the control device. The key device also includes a comparison device which prevents overwriting of the taught secret code unless it also receives the taught user code. In the event of failure of the control device, a second control device with a new user code and a new secret code can be used with the key device, after which the second control device teaches the key device the new user code and the new secret code.

13 Claims, 1 Drawing Sheet

DEVICE AND PROCESS FOR LIMITING ACCESS TO AUTHORIZED USERS

The invention relates to a device or a process for checking the user authorisation for access control devices, in particular locking devices for vehicles.

In such a device or process there is an exchange of identification data between a control device on the access side which is permanently supplied by electricity and which is located for example in the vehicle, and a key device, for example a vehicle key on the user's side. In this, the key device comprises a transponder which, during electromagnetic excitation of the control device by signals, emits a signal sequence which again is received in the control device.

In order to determine access authorisation, the control device checks whether the signal sequence received from the locking device originates from an authorised key. To this effect, starting from an initial condition in which no encryption code is deposited in the transponder, at the said transponder, a secret code is learned by that particular control device with which the key device is to be employed. The secret code in the key device then corresponds to the secret code of the control device used. All keys pertaining to a particular vehicles are to be taught the secret code of the control device in this way. The secret code as such is not readable. It serves to code the information received from the key device so that the control device recognises from the information retro-transmitted by the key device, that it is allocated to an authorised key.

Such devices are for example known from DE 4317119 C2 and DE 4435894 A1.

Because the secret code of the key device is not in itself readable, the keys taught to interact with a particular control device can normally no longer be used once this control device fails.

SUMMARY OF THE INVENTION

Starting from this, it is the object of the invention to further develop a process or a device of the kind mentioned in the introduction, to the effect that even after replacement of the control device by a further control device the existing key devices can continue to be used.

This object, in a device for checking the user authorisation for access control devices comprising a control device on the access side with memoiry means for a code;

a key device on the user side comprising a transponder; as well as comparison means in the control device for determining the authorisation necessary for release of the access device, in such a way that the information emitted by the transponder is compared with preset information fixed in the control device and in that access is granted only if the information agrees, is achieved in that, (a) the memory means at the control device on the access side store a secret code and a user code (PIN);
(b) in the transponder of the key device on the user side, the secret code and the user code (PIN) are stored by learning, in particular from the control device,
(c) the information emitted by the transponder—used in the control device for determining the required authorisation required for release of the access device, is compared with the preset information fixed in the control device— comprises user code information encoded according to the taught secret code;
(d) that the key device comprises further comparison means which are coupled with lock bits for the secret code in such a way that at least partial release for overwriting the secret code stored in the key device takes place, if the further comparison means (Vb) detect agreement between the user code (PIN) issued by the control device and the stored user code (PIN)

In a process for checking the user authorisation for access control devices, in which—between a control device on the access side, permanently supplied with electricity, and a key device comprising a transponder, on the user side— identification data are exchanged bidirectionally, whereby the determination required for access authorisation takes place in such a way that code information emitted by the transponder is compared with preset information fixed in the control device and that access is granted only if there is agreement, this object is solved in that (a) at first the key device is taught a secret code stored in the control device, as well as a user code (PIN), and that subsequently the information emitted by the transponder for comparison with the preset information fixed in the control device to determine the authorisation required for releasing the access device, is encoded according to the secret code learned; and
(b) when replacing the control device by a further control device, at first the user code (PIN) of the first control device is transferred to the key device whereby in the key device, after checking agreement of the user code (PIN) received with the user code (PIN) learned, the secret code is at least partly released for overwriting, and that subsequently, by transfer of the secret code applicable to the further control device, the key device is taught the secret code applicable to the further control device.

The invention is characterized in that in the case of one control device failing, its old PIN number is entered into the new (further) control device and in this way the area of the secret code in the key device, in the case of agreement with the user code (PIN) deposited in the key device, taught by the original control device, is released. After its release it can be overwritten with the new secret code and the new user code of the new control device, so subsequently, the same key device is authorised for the new control device. Thus, while maintaining the essential advantage, from the point of view of security, of the secret code not being readable in the key device, nevertheless the advantage of adaptability of the same key device to a replacement-/control device can be achieved.

Preferred embodiments are evident from the dependent claims.

In this, it is particularly important that the device according to the invention is protected against manipulation in that only a limited number of transfer operations of the user code PIN is permissible. For if—as is for example known from comparable code safeguards, for example for mobile telephones or automatic teller machines—an incorrect user code is entered several times, the lock of the secret code in the key device is blocked, so that it will no longer be possible under any circumstances to overwrite the secret code.

DETAILED DESCRIPTION OF THE INVENTION

Below, the invention is illustrated in more detail by means of an embodiment, with reference to the explanatory diagrams provided in FIGS 1A–1E.

Symbol A refers to a control device on the access side, in particular a control device which is permanently supplied by electricity; B refers to a key device on the user side. The control device and the key device may be electrically connected to each other through a capacitor, an inductor, or a galvanic connection, such as a chip card.

Figure 1A:
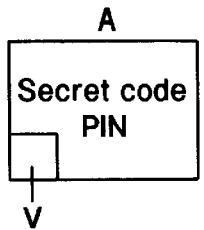
FIGS. 1A–1E depict the several views of the device in accordance with the invention.
Figure 1B:
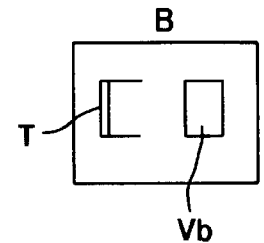
Figure 1B:
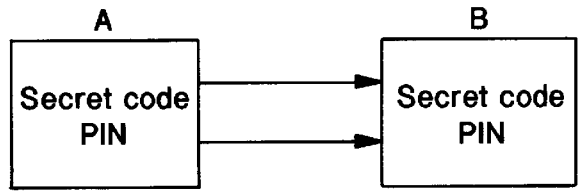

At first, as shown in FIG. 1A, the control device A comprises a secret code as well as a user code (PIN) which was programmed in at the factory. The vehicle owner only knows the user code. In contrast, the key device B is in its initial condition where there is no coding within the transponder located within the key device. In step 2, as shown in FIG. 1B, the key device B is taught both the secret code and the user code PIN of the control device A, by transferring the respective nodes into the secret code area of the transponder in the key device B. To this effect, the secret-code area of the transponder is 95 bits in length, whereby bits 0 to 15 are presettable in a key-specific way and bits 16 to 95 are presettable in a vehicle-specific way. In the area of bits 80 to 95, the user code PIN of the vehicle's control device is stored.

After this procedure the secret code is stored in such a way within the key device that it cannot be read under any circumstances. It is locked by lock bits in such a way that it is only released for overwriting with another secret code if a numerical sequence entered according to the user code PIN is identified.

This procedure according to step 2 is repeated for all key devices which are to be used in conjunction with control device A.

Figure 1C:
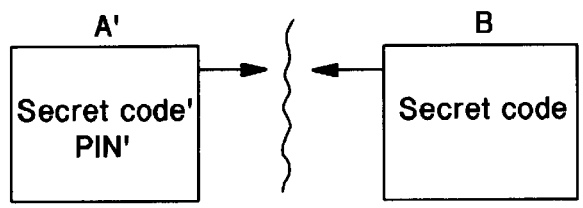

In step 3, as shown in FIG. 1C, it is now assumed that the control device A used up to now has failed and is to be replaced by a new control device A' which has been issued in the factory with another secret code' as well as a different user code PIN'. Because of this, the use of the key device B taught in respect to the original control device A is at first not possible, because there is no agreement in the secret codes.

Figure 1D:
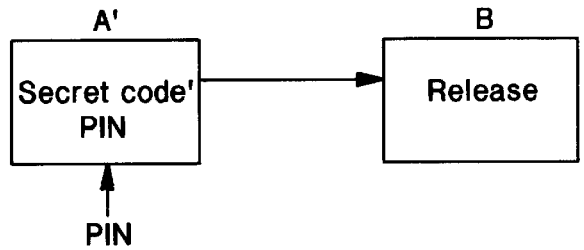
Figure 1E:
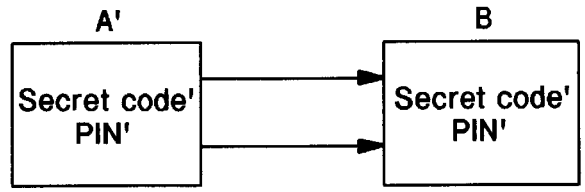

Therefore entry of the original PIN code (of the old control device A) into the new control device A' takes place according to step 4, as shown in FIG. 1D. Entry is for example by means of a diagnostic tester. By transferring the old PIN code to the transponder the key device is advised that the transponder should assume the replace mode. This means that the area of the secret code within the transponder becomes writeable by setting the lock bits accordingly. Through this, the area of the secret code in the key device is released for overwriting with the new secret code' of the new control device A' as well as the new PIN number PIN'. As a result of this, the key device B can be used with the new control device A', as shown in FIG. 1E.

The described procedure is then repeated with all existing key devices so that finally all original key devices are also useable for the new control device A'.

Thus even after exchange of the control device has become necessary, the owner of the vehicle is able to continue using the keys handed over to him at the time of purchasing the vehicle.

The procedure described incorporates a further security aspect not shown in the drawing, in that a counter is present in the key device which counts the number of transfers of the PIN code. Each time the replace mode is carried out, i.e. each time a PIN code is sent to the transponder, this counter which cannot be written on from the outside, is increased by one. In addition it is possible to preset the counter to a limit value, for example the number ten. This results in the locking of the secret code as soon as ten entries of PIN codes have occurred provided that prior to this no release of the lock bits for overwriting the secret code has occurred. This prevents for example scanning in all possible pin codes one after the other and thus setting the key into its original condition, thus rendering it inoperative.

What is claimed is:

1. A device for limiting access to authorized users, comprising:

(a) a control device, comprising a memory for storing a preset secret code and a preset user code; and (b) a key device, comprising a transponder having a memory for storing the secret code and the user code which is transferred by said control device in a secret code area, wherein the transponder emits as information the user code which has been encoded according to the secret code;

(c) a first comparison device in said control device which permits access only when it detects agreement between the information received from said transponder comprising said user code encoded according to said secret code and with said user code stored in said control device; and (d) a second comparison device coupled with a locking device in said key device which permit overwriting of said secret code stored in said memory of said key device only if said comparison device first detects agreement between the user code already stored in said key device and the user code transferred from said control device.

2. The access limiting device according to claim 1 installed in a vehicle and limiting access to said vehicle to authorized users.

3. The access limiting device according to claim 1 wherein the locking device comprises lock bits.

4. The access limiting device according to claim 1 wherein said key device further comprises a counter for counting the number of times the user code is transferred from said control device to said key device.

5. The access limiting device according to claim 4 wherein the counter has a limit value for the number of transfers that may occur which, when reached, blocks further overwriting of the secret code in said key device.

6. The access limiting device according to claim 1 wherein the secret code area comprises several sections.

7. The access limiting device according to claim 6 wherein one of the sections is presettable in a key-device-specific way and another section is presettable in a control-device-specific way.

8. The access limiting device according to claim 7 wherein the section presettable in a control-device-specific way comprises the user code.

9. The access limiting device according to claim 1 wherein said control device and said key device are electrically connected to each other by a chip card.

10. The access limiting device according to claim 1 wherein said control device and said key device are electrically connected to each other capacitively or inductively.

11. A process for limiting access to authorized users in an access limiting device, comprising a control device wherein a preset secret code and a preset user code are stored, and a key device having a transponder which exchanges data bidirectionally with said control device, said process comprising the steps of:

(a) transferring the secret code and user code from the control device to the key device wherein they are stored;

(b) encoding the transferred user code in the key device according to the secret code;

(c) emitting the encoded user code from the transponder to the control device;

(d) comparing the encoded user code received from the transponder in the control device with preset information fixed in the control device, and, if it agrees, allowing access to the access limiting device; and (e) if the control device is replaced with a second control device having a second secret code, comparing the user code transferred by said second control device with the user code already stored in said key device and, if they agree, permitting the secret code already stored in said key device to be overwritten with said second secret code of said second control device.

12. The process according to claim 11 wherein the access limiting device is a locking device for vehicles.

13. The process according to claim 11 wherein the secret code already stored in the key device can be overwritten only if a preset number of transfers of the user code has not been exceeded.

* * * * *